US006947708B2

(12) United States Patent
Fattouch

(10) Patent No.: US 6,947,708 B2
(45) Date of Patent: Sep. 20, 2005

(54) METHOD OF OBTAINING AN ANTICIPATORY ESTIMATE OF A CELL'S WIRELESS COVERAGE

(75) Inventor: Imad Fattouch, Paris (FR)

(73) Assignee: Societe Franciase du Radiotelephone, Parlis La Defence (FR)

( * ) Notice: Subject to any disclaimer, the term of this patent is extended or adjusted under 35 U.S.C. 154(b) by 522 days.

(21) Appl. No.: 10/215,364

(22) Filed: Aug. 9, 2002

(65) Prior Publication Data

US 2003/0073442 A1 Apr. 17, 2003

(30) Foreign Application Priority Data

Aug. 10, 2001 (FR) .......................................... 01 10718

(51) Int. Cl.[7] .............................................. H04B 17/00
(52) U.S. Cl. ................................ 455/67.16; 455/422.1
(58) Field of Search .......................... 455/67.16, 67.11, 455/422.1, 429, 552.1

(56) References Cited

U.S. PATENT DOCUMENTS 6,021,316 A * 2/2000 Heiska et al. ............ 455/67.16
6,507,742 B1 * 1/2003 Lin et al. .................... 455/446
6,748,233 B1 * 6/2004 Arnold et al. ............. 455/522

FOREIGN PATENT DOCUMENTS

WO WO 97 44977 A 11/1997
WO WO 01 06349 A 1/2001

OTHER PUBLICATIONS

Kurner, et al: "Concepts and Results for 3D Digital Terrain-Based Wave Propagation Models: an Overview"; *IEEE Journal On Selected Areas of Communications*, IEEE Inc. New York, US, vol. 11, No. 7, Sep. 1, 1993, pp. 1002–1012, XP 000400010.

Dottling, et al: "Modeling of the DECT Outdoor Radio Channel" *Vehicular Technology Conference*, 1997, IEEE 47$^{th}$ Phoenix , Arizona, May 4 to 7, 1997, New York, NY, IEEE US, May 4, 1997, pp. 1947–1951, XP010229126.

Aguado, et al: "Indoor and Outdoor Channel Simulator Based on Ray Tracing" *Vehicular Technology Conference*, 1997, IEEE 47$^{th}$ Phoenix , Arizona, May 4 to 7, 1997, New York, NY, IEEE US, May 4, 1997, pp. 2065–2069, XP010229161.

Tan, et al: "Improved Three–Dimensional Ray Tracing Technique for Microcellular Propagation Models" *Electronics Letters*, IEEE Stevenage, GB, vol. 31, No. 17, Aug. 17, 1995, pp. 1503–1505, XP006003247.

* cited by examiner

*Primary Examiner*—Vivian Chin
*Assistant Examiner*—Sanh Phu
(74) *Attorney, Agent, or Firm*—Lowe, Hauptman & Berner, LLP

(57) ABSTRACT

A method of anticipatorily estimating the radio coverage by a base station of a cell of a cellular wireless telephone network includes devising a numerical map having a direct-access data matrix of local and independent specifications for the positions and types of salients of a plurality of predetermined meshes of a mesh topology corresponding to the map. In an operational phase, a simulated sampling beam associated with the radioelectric propagation conditions is transmitted in the cell along an initial path segment from an initial position and along a determined direction and under determined conditions of propagation. The position of the instantaneous site is compared with the mesh topology to identify an incidence mesh at a salient. Post-incidence propagation conditions are computed on the basis of local and independent data for salients of the incidence mesh.

19 Claims, 5 Drawing Sheets

METHOD OF OBTAINING AN ANTICIPATORY ESTIMATE OF A CELL'S WIRELESS COVERAGE

FIELD OF INVENTION

The present invention relates to defining cellular, wireless telephone networks to be set up in a territory and in particular to a method of obtaining an anticipatory estimate of the territory's radio coverage for the purpose of determining operational parameters and the optimal positions of base stations or repeaters of the network, namely the boundaries of the corresponding cells.

As is known, a wireless telephone network includes a plurality of ground base stations which are interconnected by a wired telephone network and which can be accessed by mobile terminals when the latter are within the station's wireless cell.

BACKGROUND ART

Radio propagation within a cell must meet two essential requirements, namely transmission at less than excessive power by the base station and reception of sufficiently powerful signals at the terminals.

In the first place the range of each base station must be adequate to extend into an adjacent cell in order to preclude any danger associated with a loss of contact that occurs when a mobile terminal moves into another cell. Accordingly the power at the transmitter must exceed a rigorous minimum.

In the second place, because the radio links propagate substantially straight at ground level, the station's shadow zones caused by the local topography or by buildings must also be covered. A shadow zone is a zone wherein the attenuation of radio propagation between a mobile terminal therein and a station falls below a specified sensitivity for radio circuits, whereby a received level is inadequate to properly detect transmitted bit packets representing voice or data to be exchanged. On the other hand, the levels of transmitted power cannot be increased.

The reason is that, at the base station, any increase in power also would increase cell size, entailing undue interference between adjacent cells. Maximum power at the mobile terminals is limited on safety grounds and the operating time of charged batteries at the mobile terminals.

Furthermore the number of base stations or repeaters must not be needlessly multiplied to take care of the microcells—the shaded areas—so costs and interferences can be managed.

In the prior art, the attenuations are ascertained at a plurality of sites in a cell by using a vector database from the French National Geographic Institute (IGN) for instance, which represents a map of the geographic zone under consideration. The map contains buildings and other aboveground structures. Different code words define the kind of above-ground structures, for instance woods, lodgements, water, which are specified in Lambert coordinates and height above the local ground altitude relative to the sea.

The transmission of radio signals is simulated to provide an anticipatory estimate of the attenuation at any point within the cell. Propagation is modeled by computing a set of radio coverages in a computer as an electromagnetic beam centered on the base station. The propagation extends in a given direction, and the cell propagation conditions are then calculated within the element of a solid angle subtended by the beam. Except for the propagation in free space when the station is in direct line of view with a simulated radio terminal—from which follows a known linear propagation attenuation—the beam path strikes obstacles which attenuate it or additionally deflect it, in particular within microcells where the stations are situated at an altitude lower than the buildings' roofs.

Illustratively, in a street, the beam can deviate by reflection or refraction. As a result the aperture of its solid angle can increase.

Such calculations are repeated for a plurality of elementary solid angles distributed within a global solid angle of view of the entire cell, for instance a substantially horizontal annulus, in order to sample the various propagation conditions of the cell's space.

At each point of each beam's path, an operator consults the vector database to determine whether an obstacle is present. The related vectorial calculations require considerable computing power and might entail a day's work, and in practice the calculations must be initiated during the evening when conventional computers are used.

The objective of the present invention is to reduce the computing power required to calculate the radio coverage of such cells, whether the cells be large, i.e macro-cells, or microcells.

SUMMARY OF INVENTION

For that purpose the present invention relates to an anticipatory estimation method applied to the radio coverage of a cell of a wireless telephone network, said estimation being carried out by a cell traffic-managing radio station using a topographical map as the database containing the positions and the nature of the salients of the cell. In this method a computing system operates to:

- simulates irradiation of the cell with a sampling beam representing the radio propagation conditions along an initial path segment from an initial position and along a given direction and under specified propagation conditions,
- the database, to compare the path segment to the data of the topographical map in order to identify the position and the nature of any instantaneous incidence site on the path segment comprising a salient,
- determines new conditions of propagation on a downstream path segment beyond said incidence site depending on the information about the particular salient stored in the data base,
- iterates the two previous steps a given number of times at other downstream path segments as called for,
- determines the cumulative attenuation at any point selected along said point in light of all the conditions of propagation along the full path, and repeats all the above stages a plurality of times for a plurality of initial directions in order to sample the entire cell and in this manner determine an attenuation map of the selected sites In an initial phase,

- the computing system devises the database in the form of a direct-access data matrix containing the local and independent specification of the positions and natures of the particular salients of a plurality of predetermined meshes of a mesh topology corresponding to the map, and
- the system stores the geographic-orientation data of the salients in a matrix database.

During an operational phase, the computing system:

compares the position of the instantaneous site with the mesh to identify a mesh containing an incident beam, computes post-incidence propagation conditions from the specified local and independent data of the salient of the incident mesh, and computes a direction of a beam reflected from the downstream segment based on orientation data.

Because the propagation data have been divided into a plurality of independent data, and hence have reduced size, they can be quickly accessed to be read in useful form.

Accordingly computation of the propagation conditions downstream of the impact site is based solely on local data and on direct access rather than sequential access as in the case of a vector database. The data define the incidence site, the anisotropic radio propagations that determine, by attenuation, reflection or diffraction, possibly with scattering, and a possible angular deflection and new propagation attenuation.

In the absence of an obstacle including a salient, the conditions of propagation in free space are very well known. In particular in this case, the data readout from a crossed mesh at once show there is no obstacle and therefore the next mesh is considered without necessity of the prior art's ponderous computations of reconstituting a local data vector based on a global database.

The term "salient" in this document always means a propagation obstacle, including even a horizontal ground, that might at least partly absorb or reflect the radio beams.

Advantageously the computing system in its initial stage stores the geographic orientation data of the salient into a matrix database and, in operation. Based on the orientation data, the computing system computes the direction of a beam reflected at the downstream path segment.

Preferably for this case, storage is restricted to azimuthal data and, during operation, the direction of the beam reflected from the downstream path segment is computed by assuming that the reflecting salients are vertical.

As a result computations are limited.

In particular, data specifying the kind of above-ground structures are integrated into the matrix database, and, in operation, the computing system computes the propagation conditions on the path segment as a function of the type of above-ground structure.

In this manner, higher grade propagation computation is attained.

In order to take into account details of the salients, the data concerning the edges of the salients can be initially integrated into the matrix data base. During operation, the computing system computes a downstream-segment direction of the refracted beam from the edges-data.

Preferably again, attenuations from the salients are initially stored in the matrix database. In operation, the computing system computes a propagation attenuation of the downstream path segment based on said attenuation data.

Again, in a similar case, the attenuation data can relate to reflection from the salients and be used to compute the attenuation of the downstream path segment and/or the attenuation data concerns propagation through the salients and are used to compute the attenuation of the beams passing through them.

Advantageously the propagation-attenuation data through the salients also includes transition data between propagation media that specify salient-penetration attenuations in these salients. The latter attenuations are used to determine local penetration depth.

In order to attain higher quality modeling of the propagation conditions, an algorithm is provided to compute the beam's angular dispersion following incidence, the computing system computes a plurality of directions of downstream path segments at specified attenuations that constitute a solid dispersion angle of the beam downstream of the place where the beam is incident on the salient.

Also the consecutive incidences along the beam path are preferably counted. As regards the second incidence, in order to compute the farther out propagation conditions, the computing system assumes the beam is polarized at the first impact point.

In order to keep track of the magnitudes of the required computations, the computing system counts the successive incidences along the beam path and compares the total to a high threshold value in order to stop performing in the operational phase when the threshold has been reached. Alternatively, the computer system determines at each incidence point the cumulative attenuation and compares the latter to the cumulative attenuation with a maximum attenuation threshold value to cease carrying out the procedural steps when the threshold is reached.

To optimally make use of the results attained, the attenuation map is stored in 3D.

In this manner the anticipated quality of the radio links according to the building floors can be estimated.

In particular, in order to develop the database, the computing system represents the map by a bundle of vertically extending pixel strings which it divides to forth stacked elementary volumes of meshes each including its particular data.

Preferably the computing system assumes that the initial position is at the station, though it also can assume the initial position is an arbitrary one within the cell, and the beam transmission direction is selected as a function positions and types of the nearby salients in order that the beam travels near the station.

After the propagation conditions within a microcell in contact with a cell—where the latter is larger and also is termed "macrocell"—have been computed in the manner of the present invention, the computing system can compute the propagation conditions within the cell, and then smooth the two computations relating to a boundary zone between the cell and the microcell.

In this manner the method of the invention allows improved functional integration of the two kinds of cells.

The invention is described in the description below of a preferred embodiment mode and in relation to the attached drawings.

DETAILED DESCRIPTION OF THE DRAWINGS

Figure 1:
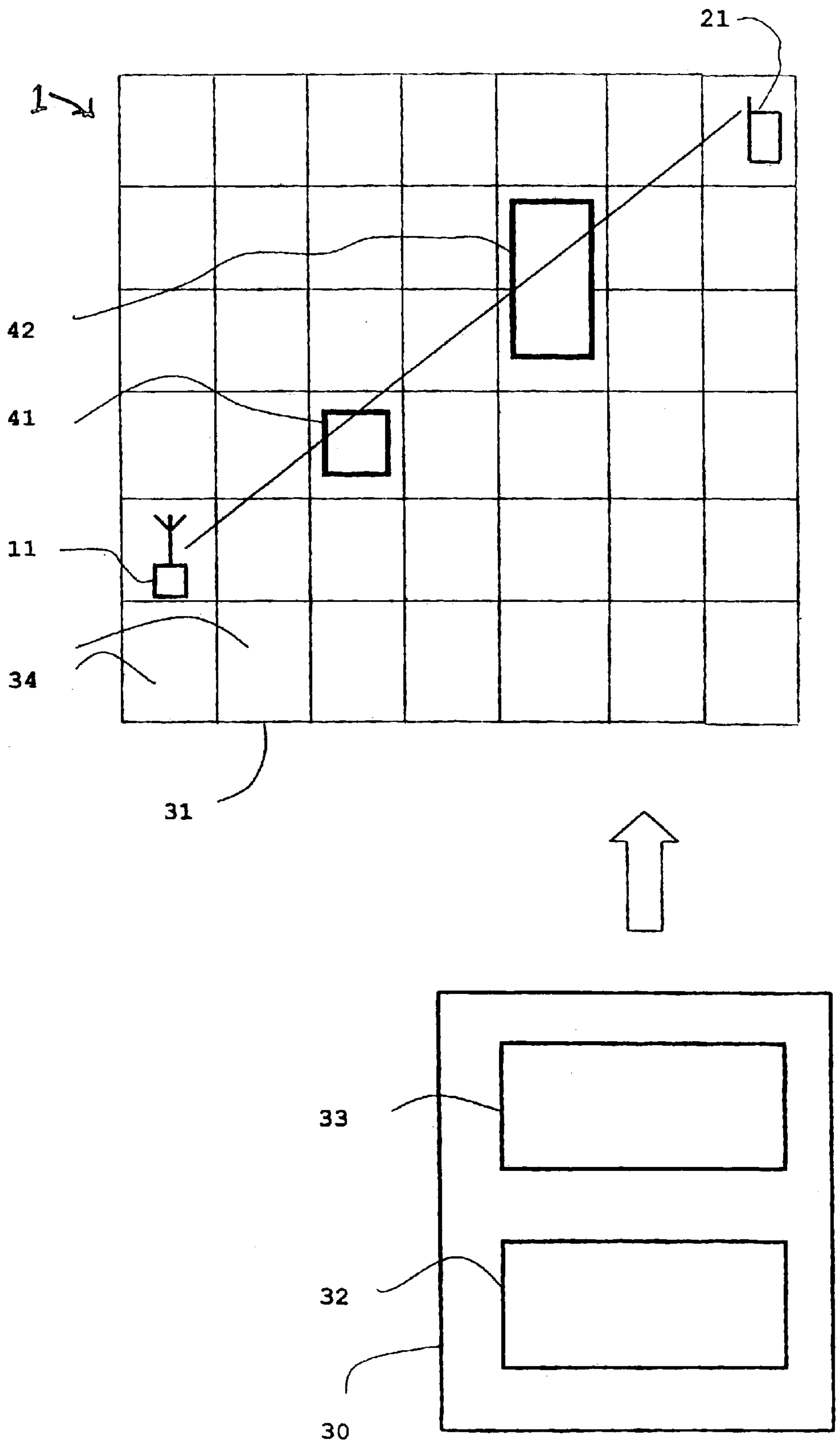
FIG. 1 is a geographic relief map constituting a database onto which is entered the position of a cell of a cellular wireless telephone network being set up.

FIG. 1 shows the position of a cell 1 of a cellular wireless telephone network designed for terminals such as denoted by 21, said cell position being indicated in a portion of the geographic map 31 also showing the intended position of a base radio station 11 managing the cell 1. The map 31 enables a determination to be made of the expected contours of a plurality of cells constituting a radio network. The radio network is set up by adjusting the number of cells, their sizes and position in order to optimize the equipment bulk while assuring the desired radio coverage at a specified service quality.

Map 31 in this instance denotes elements of the terrain, on and above ground, in the zone of interest. The corresponding geographic data enabling this display to be generated are stored in a salients database 32, 33 of a computer 30. This database comprises a memory module 32 specifying the shape and topography of the ground and above-ground terrain and is associated with a memory module 33 storing, the ground and above-ground morphology and specifying the nature or features of radio propagation of the various localized ground functions within a given frequency range corresponding to the frequencies used by the base stations. The morphology data of the memory module 33 represent the various sites of the terrain under consideration together with the salients or shapes of the geographic memory module 32. Be it borne in mind that the term "salient" is construed broadly to denote any obstacle on which the beam from the station 11 is incident directly or after having been deflected. Accordingly the term globally deals with the ground an above ground features. Besides the buildings, hills and the like, it also can denote the slopes of valleys or plains or expanses of water.

As is discussed further below, the data from the memory module 33 enable computer 30 to determine—directly or using a correspondence table involving the nature and data of radio propagation features—the perturbation imparted to an incident radio beam in order to ascertain the direction and the attenuation of the amplitude of a corresponding downstream beam. In this instance the map 31 per se only serves a didactic purpose because the data defining it are contained in the computer-processed memory modules 32, 33.

In an alternate embodiment, the base station 11 is replaced by a station operating in the same manner but having a shorter range for the purpose of defining a microcell. As initially indicated above, the microcells are in zones of strong salients or in urban areas to cover the radio shadow zones of conventional cells.

It is assumed at this point that a narrow radio beam linking the station 11 to the mobile terminal 21 within the cell 1 encounters obstacles 41 and 42 respectively representing a building and forest trees. For simplicity of exposition, it is also assumed that the obstacles 41, 42 of FIG. 1 do not deflect the beam path which therefore remains straight and undergoes no reflection or refraction by the obstacles.

Figure 2:
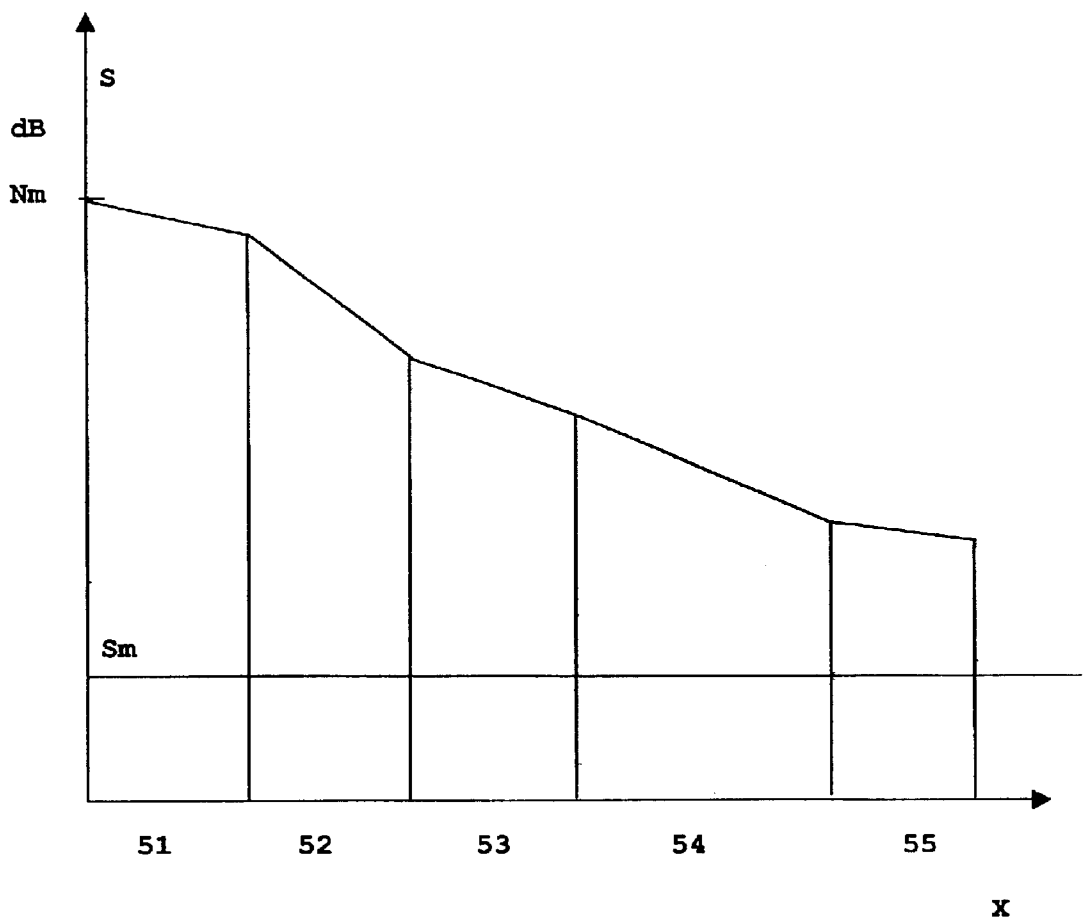
FIG. 2 is a radio attenuation function within the cell along a beam path including obstacles, the base station forming one end of the said path.

FIG. 2 is a plot, with the ordinate in dB of the radio-signal level S as a function of the distance X covered along path of the abscissa. Starting at the transmission site, the signal level decreases with distance of propagation and therefore represents attenuation. This attenuation is the sum of the attenuations of various path segments, each of which corresponds to a specific propagation medium.

In this instance there are five segments consecutively referenced from 51 through 55 and respectively corresponding, as regards the first segment 51, to the attenuation along the air path from the base station 11 to a building 41; as regards the second segment 52, to the attenuation due to passing through the building 41; as regards the third segment 53, to the attenuation due to the air path to the front edge of a wooded area 42; as regards the fourth segment 54 to the attenuation due to crossing the wooded area 42 and as regards the fifth segment to the attenuation due to the air path from the back edge of wooded area 42 to the mobile terminal 21.

Figure 4:
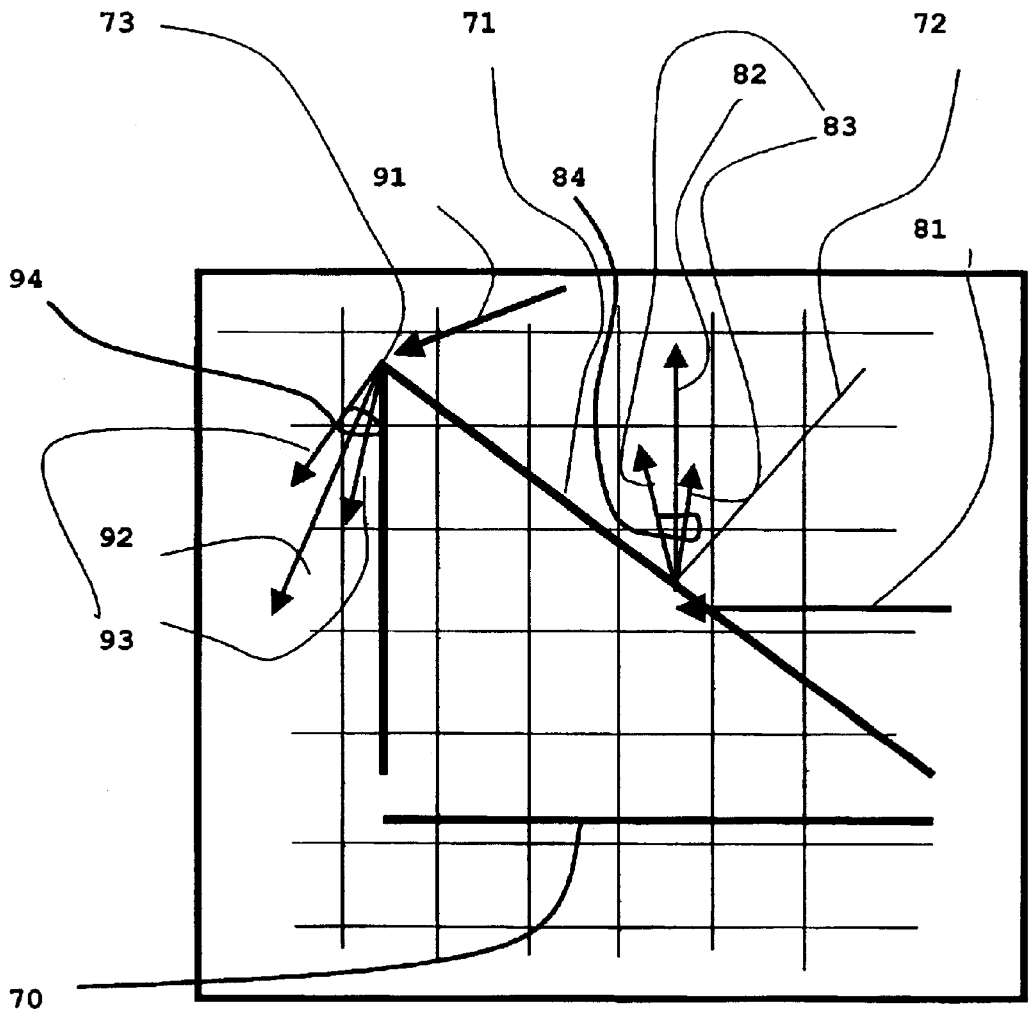
FIG. 4 is similar to FIG. 3, including reflection and refraction at a building.

The attenuation per unit length of the radio propagation in the free space of air is shown by the slope of the signal level on FIG. 2. This attenuation is a well known physical constant at a given carrier frequency, as a result of which—and based on the propagation distances contained in the database representing the map 31—the computer 30 therefore is able to compute the three respective attenuations. On the other hand, the obstacles 41, 42 provide increased attenuations. Moreover, and as already mentioned, some types of obstacles also can deflect the path as shown in FIG. 4. To verify the anticipated radio coverage, the field as it spreads from diverse sites through the entire cell 1 must be computationally estimated for the links between the base station 11 and the movable terminal 21.

The anticipated link budget so computed—i.e. the sum of the attenuations relating to the path segments 51 through 55—cannot exceed the difference between a maximum transmission level Nm of the base station 11 and a predetermined sensitivity threshold Sm of the terminal 21. This constraint also applies to the up-direction of communication from the mobile terminal 21 toward the base station 11, in this instance 2 watts, and a sensitivity level of the station 11. These sensitivity levels take into account a detection code for propagation errors and for a bounded number of error bits in the bit packets exchanged through time-division channels of a radio frame.

For efficiency, the computer attenuation computations call only take a limited time, much less than one day's work.

For that purpose, the map 31 assumes the form of a geographic relief map representing the cell 1 and the database 32, 33. Map 31 also specifies the positions of salients, such as 41 and 42 and others which intrinsically affect radio propagation conditions, such salients for instance being high buildings, woods, lodgements, lakes and others. Predetermined meshes are assigned to the map 31 in an initial stage, and the numeric data of the salients which the map comprises are assigned to each mesh 34 of the geographic matrix thusly set up in order to make available a matrix database, i.e. a mosaic, of salient specifications, which can be used in the operational stage.

In practice, a human operator or the computer 30 defines the mesh topology and loads into the memory modules 32 and 33 respectively the shapes of the salients of each mesh 34 and the data describing the nature of such salients. As mentioned above, these data identify the salients such as woods, buildings, and a general correspondence table allows computer 30 to determine therefrom the propagation conditions of the beams incident on the particular salient. As a variation, the propagation-parameter values are loaded directly into the memory module 33, without need to store the kinds of salients.

To anticipate an estimate of the radio coverage of cell 1 by the radio base station 11 managing the traffic of this cell 1, computer 30, operates the database 32, 33 to form the relief map that specifies the positions and kinds of salients, such as 41 and 42, of cell 1.

The computer 30 simulates transmission in the cell of a sampling beam representing the conditions of radio-electric propagation along an initial beam path, for instance 11, 41, from an initial position and in a direction and propagation conditions that are fixed, that is in practice through air.

By reading the database, the computer 30 compares the path segment 11, 41 with the relief-map data, in this instance specifically those data of the memory module 32, in order to identify the position and nature of any instantaneous incidence site in the path segment comprising for instance a salient 41.

Depending on the specific nature of the salient 41 under consideration, the computer 30 ascertains new propagation conditions along a downstream portion of the path 41, 42 (segment 52) beyond the incidence site at 41.

Where called for, computer 30 iterates the two preceding steps a given number of times for other incidences at the downstream path portions 53, 54.

Depending on the propagation conditions over the full path from 11 to 21, computer 30 determines a cumulative attenuation at any point along the path and it repeaters all the above steps a plurality of times for a plurality of initial directions in order to sample the full cell and in this manner to establish an attenuation map of the selected sites.

Moreover—and having previously established during the initial steps the database 32, 33 in the form of a matrix or mosaic of data relating to the local and independent specification of the plurality of predetermined meshes 34 of the mesh topology corresponding to the map 31—it is possible therefore, as regards the operational stage:

- to compare the position of the instantaneous site to the mesh topology in order to identify the incidence mesh 34, and
- to compute the propagation conditions after incidence (for instance the path segment 41–42) from the data of local and independent specification of the salient of the incidence mesh 34.

In general therefore the database 32, 33 specifies within each mesh, in particular in the memory 33, the local radio anisotropy, that is the distortions imparted to the radio beam such as deflection, attenuation, diffraction, polarization and others. In a certain way, for each mesh 34, an ellipsoid of anisotropy that determines the propagation conditions in space, is thereby defined, this ellipsoid relating to three inherent directions, for instance three orthogonal unit vectors having an abscissa and ordinate; the three vectors are, e.g., local parallel, meridian and vertical.

Actually there are multiple ellipsoids as discussed because specifying the values of several propagation variables, makes it possible, for instance, to compute the exit direction of an incident radio beam as function of its angle of incidence on the map 31. Alternatively, the attenuation corresponding to crossing the mesh 34 is a function of two directions, namely angles of incidence and exit. Accordingly this is a matrix that transforms the propagation conditions of the diverse meshes where the data are stored in independent, zones of the memory module 33.

When the appropriate zone for the mesh 34 is read from the memory module 33, it is possible to rapidly ascertain the propagation conditions at the mesh exit point from the path segment at the entry point, for instance path segment 11, 41. In particular, one bit per mesh 34 can specify whether the mesh 34 under consideration does or does not contain an obstacle. By direct readout of the obstacle, which where called for is arrayed with its homologs in a rapid-access and compact register, absence of obstacle is detected immediately and the computer 30 at once moves on to examine the following mesh without computing new propagation conditions. Accordingly except for reading the bit indicating that there is an obstacle, the computer 30 then does not consult the data module 33 that specifies the nature of the radio obstacles. Calculation of the attenuation at the instantaneous site from mesh to mesh along the beam path is not required: The cumulative attenuation must be computed only when there is an obstacle by computing the distance between the two end meshes 34 of the beam path under consideration. Experience has shown that the computations applied to a 500 m mean-radius cell require a time of about 1 minute for a computer having typical computing power.

Having fixed or computed the angle of incidence of the beam in the space of the map 31, the computer 30 thereby can directly read the memory module 33 for all corresponding values of the propagation parameters of the beam exiting the mesh 34—provided the beam in fact is able to exit the mesh.

Considering that the map 31 is a relief map, the mesh topology of the data preferably and, as in this example, is implemented in three independent dimensions like those cited above. In other words, a bidirectional topology of so-called horizontal meshes 34 can be defined. Each horizontal mesh 34 is associated with a vertical extension volume divided at various altitudes that can be specific to each horizontal mesh 34 by means of planes or other surfaces in order to define volume elements, each storing particular propagation data in a zone of the memory module 33. In most cases, two volume elements suffice for one horizontal mesh, the one below illustratively containing all of a building and the one above corresponding to free space. On the other hand as regards overhanging salients, such as arched buildings or bridges, a freely propagating third volume element must be provided underneath a volume element containing the obstacle under consideration.

In other words, the map 31 is shown as a bundle of pixel strings for each mesh 24 and the vertically extending pixel strings are divided to constitute stacked volume elements of 3D meshes, each having particular data.

The specification data of the features or nature of the salients of each mesh 34, which were integrated during the first stage, can correspond to one or more of the following data.

The specification data of the salients in the memory 32 can include the geographic orientation data of the salients, illustratively indicating a radio reflecting plane. Knowing the incident path portion or segment, the direction of the downstream reflected path segment is then computationally inferred. The reflected segment is symmetrical relative to the normal at the reflecting plane and the site of incidence. In air, in the absence of an obstacle in the first Fresnel ellipsoid (direct propagation), the attenuation in the near field is about 20 dB/km over the first 500 m of beam path; beyond this attenuation rises to 30 dB/km.

Figure 3:
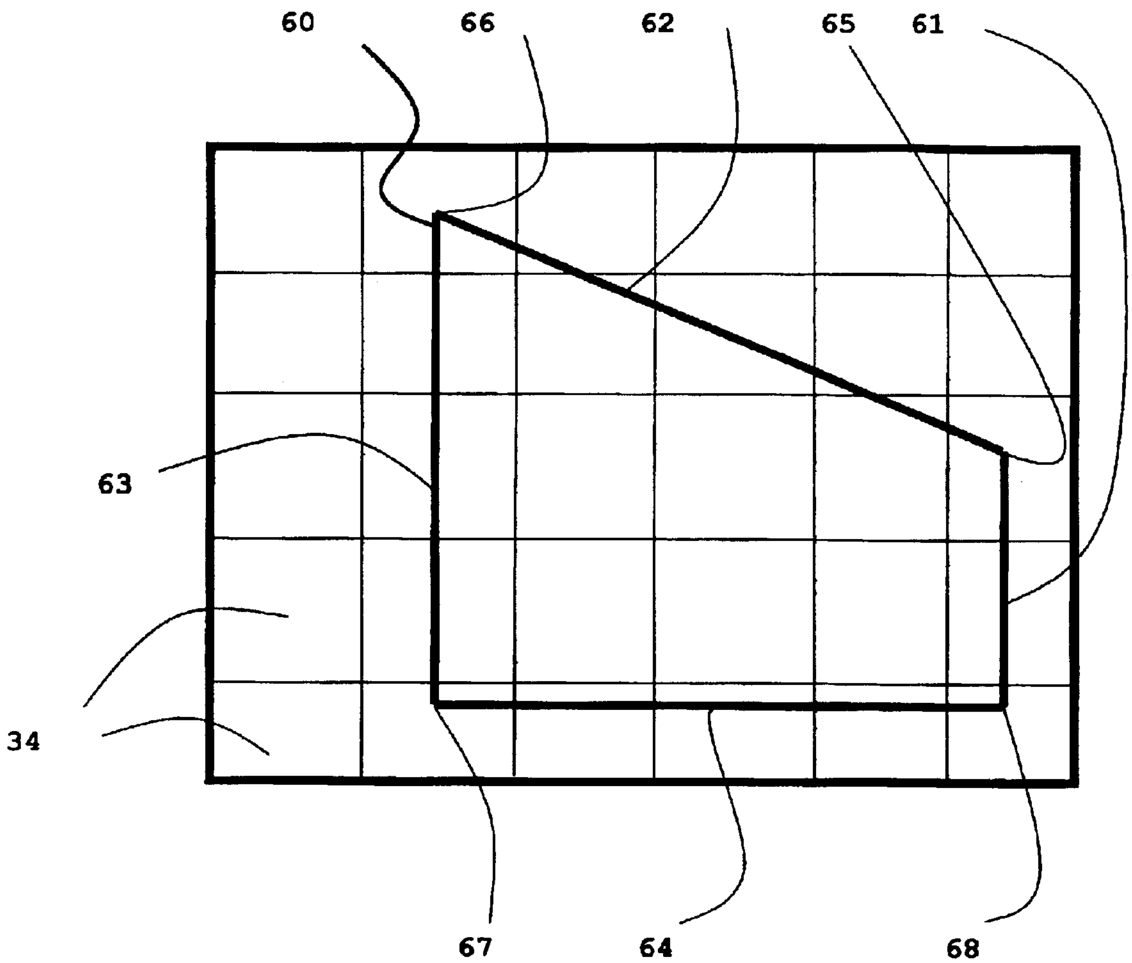
FIG. 3 is a top view of a building contour of part of the map.

Accordingly FIG. 3 is an illustration of the contents of a table of matrix data of the memory module 33, the contents being schematically shown in graphic form in a part of map 31 for better clarity of exposition.

FIG. 3 includes several horizontal meshes with plotted building surfaces. The particular building under consideration has four straight walls 61 through 64 and a trapezoidal shape with four wall corners or edges 65 through 68.

In the memory module 33 the four meshes including one of the wall edges comprise data specifying that characteristic. Moreover the value of the angle of the edge and even the orientation of its sides can be specified. The other meshes 34 crossed by one of the walls 61 through 64 include data specifying this feature. In this instance, practically, these data specify the orientation of the wall under consideration, that is its azimuthal direction. Moreover the slope of the salient also can be specified where the salients are different, for instance if the salients are natural formations. In such cases, these orientation data of the salient plane can be defined by the normal to the salient illustratively stated by the above cited 3D coordinates.

However to keep the memory module 33 compact, the orientation data of the salient can be limited to the azimuthal data and, as regards operation, the direction of the beam reflected at the downstream path segment is computed in light of the reflecting salients of the beam under consideration being vertical—this is the general case in an urban area.

Moreover data specifying one kind of above-ground structures, such as trees, lodgements and the like, also can be integrated into the memory module 33 of the matrix database, the computer system 30 computing the propagation conditions in the downstream path segment depending on the specified above-ground structures.

If, in the initial stage, the salients' edge data are integrated into the memory module 33 of the matrix database, it is feasible, in operation, for computer 30 to compute a direction of a refracted downstream beam on the basis of the edge data. As already indicated, refraction generally results from vertical building corners or edges. However roof edges and ridges can be specified as well in the memory module 33 in order to determine similarly a refraction direction of the incident beam shown illustratively as being deflected downward. The above deflections increase the size of the coverage zone of the cell 1 because they point the refracted beam toward a region which, in straight propagation, would be a shadow zone.

In the initial stage, the computer system integrates attenuation data of the salients of the matrix database 33 into the memory, and, in operation, the computer system ascertains beam attenuation on the basis of the above attenuation data.

The attenuation data might relate to reflection from the salients 60 in which case the data are used to compute the attenuation of the reflected beams, which for instance might be about 7 dB, this value depending on the morphology of the building face such as glass, brick or other.

Moreover, or instead, the attenuation data might relate to the propagation through the salients 41, 42, 60, in which case the data are used to compute the attenuation of the beams which propagate in the salients as shown in FIG. 2.

In particular, the propagation-attenuation data relating to crossing the salients 41, 42 might also include data concerning a transition between propagation media and specifying attenuations of penetration into the salients or a change in the propagation medium, the data being used to ascertain a local attenuation of penetration, for instance of air/building.

FIG. 4 is similar to FIG. 3, however the building 70 shown in the former assumes, in top view, and in this instance, a simple, triangular shape for the sake of simplification. A beam 81 is incident on a site of the face 71 of the building 70, the site being situated in a mesh 34 completely crossed by the face 71.

According to the corresponding data of the mesh of the memory module 33 denoting the azimuthal direction of the building face 71 and furthermore indicating that the mesh 34 under consideration is completely crossed by face 71, the computer 30 determines that the incident beam 81 is reflected at the face into a beam 82. Computer 30 computes the exit direction of beam 82, together with the local normal 72 to the face 71. Local normal 72 subtends an angle which is equal and opposite to that subtended by the incident beam 81.

As indicated in this Figure, the reflected beam 82 indeed defines the main direction of a lobe 84 including accessary beams 83 including in the lobe and thereby constituting a solid angle in space: the beam 81 excites the zone on which it is incident to thereby generate a secondary source of electromagnetic radiation that is more diffuse than a conventional primary source, and has an isotropic pattern.

In order to better model the propagation of this instance, the computer system by means of an algorithm for calculating angular dispersion determines the plurality of directions of the beams 82 and 83 having specific attenuations that constitute the solid diffusion angle of the incident beam 81 beyond the site of incidence. This feature can apply to the beams reflected from inhomogeneous surfaces, such as building faces with windows and balconies, and to the diffracted beams. To illustrate the latter feature, a beam 91 is shown as being incident on the face 71 but in a zone containing a vertical edge 73. The data of the memory module 33 of the mesh 34 under consideration specifies the presence of the edge by indicating a main diffraction direction for an exit beam 92 and a solid angle 94 for accessary diffracted beams 93. The above description also applies to edges slanting with respect to the vertical. Therefore FIG. 4 also can be deemed as being a vertical section of a salient through superposed, horizontal rows of meshes, as an illustration that the diffracted beam may "crash" toward the ground within a volume that, a priori, can be assumed to be a zone of radio shade.

Be it borne in mind that the memory module 33 can simultaneously contain orientation data enabling computer 30 to compute a partial reflection (82) and data to compute a diffracted beam 92 provided that the incident beam 81, 89 has a cross-section roughly equal to the area of a mesh 34 that is only partly affected by the presence of the edge 73.

Figure 5:
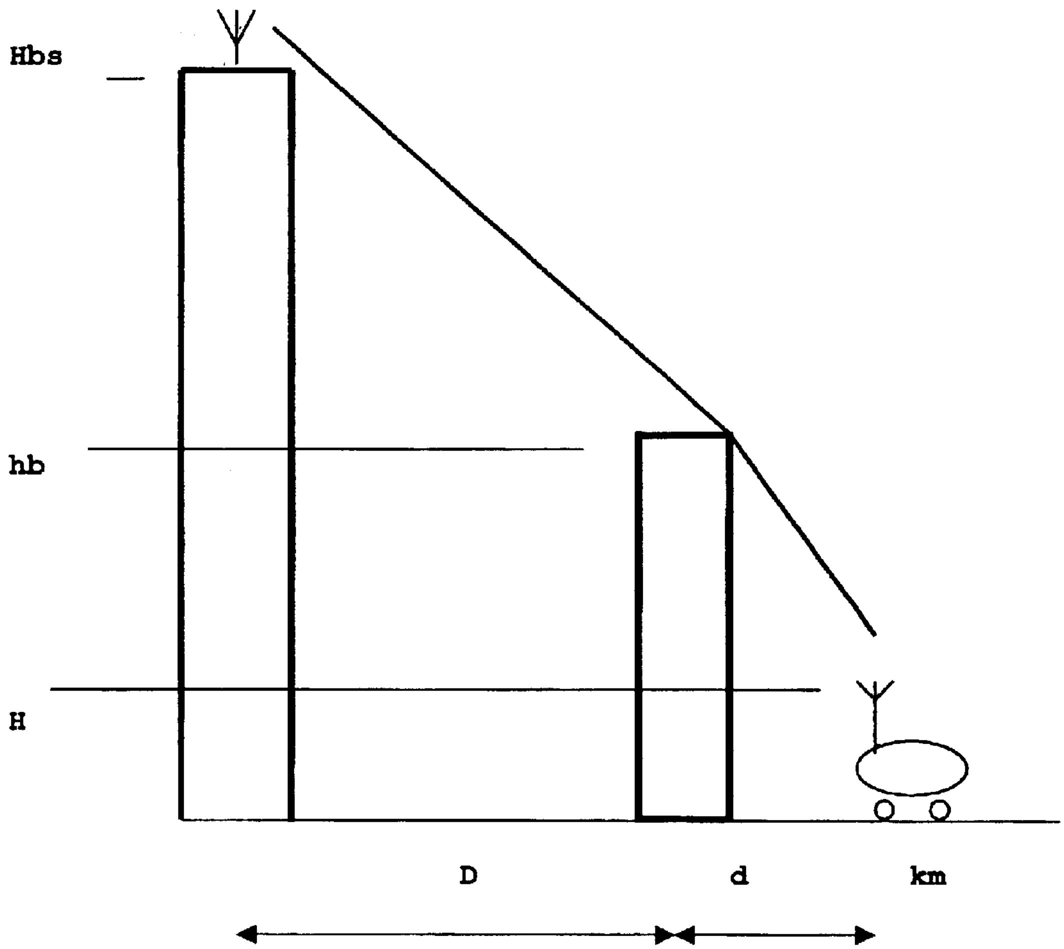
FIG. 5 is a vertical section including propagation between buildings within one macrocell.

As regards FIG. 5, the roof diffraction attenuation $L_{r-m}$, where r−m means roof to mobile (terminal), can be computed from the following formula:

$$L_{r-m}=-16.9-10\log W+10\log f+20\log(hb-Hm)$$

or is equal to 0 if $L_{r-m}<$ where

W=width of a beam received by the antenna of the base station 11 f=frequency (MHZ)

hb=height of the roof diffracting toward the mobile terminal

Hm=antenna height of the mobile terminal 21.

In order to further improve the, accuracy of the estimated attenuations, the successive incidences of the beam path (51 through 55; 81 82; 91, 92) are counted in this embodiment. In order to determine the propagation conditions beyond a second incidence point, it is assumed that the beam is polarized during the first incidence: A beam reflected or diffracted at a building face undergoes at least a partial and substantially vertical polarization. Consequently, for lack of horizontal polarization components—which were eliminated at the first incidence and which amounted to a large proportion of the total attenuation—the attenuation now has a lower magnitude at the ensuing incidences. In this way, the beam has been made to match, so to speak, the obstacles it meets. On the average, reflective attenuation changes from 7 dB for the first reflection to 3 dB at the ensuing ones.

In order to make available radio coverage data regarding the various building floors and to process the above mentioned overhang structures, the map or base terrain of attenuations is set up in three dimensions in this embodiment.

To prevent needlessly increasing computing time, the computing system counts the consecutive beam incidences and compares their total to a high threshold value, which when reached causes operations to cease.

For the same purpose, or complementarily or instead, the computing system at each incidence determines the cumulative attenuation and compares it to a maximum threshold value in order to discontinue operation in response to the threshold being reached.

Be it borne in mind that, in a variant of this particular embodiment, the principle of beam path reversal can be used, namely to transmit such a beam from any position of the mobile terminal 21 toward the base station 11 by shifting in the above manner the position of the mobile terminal 21 through the entire cell 1.

However, in such a case, some uncertainty arises about the success of each test because a beam transmitted toward the base station 11 might be deflected, and inversely a beam emitted in another direction can be shifted in direction by a salient on which it is incident. Therefore a larger number of beam emitters must be used, for instance within a large solid angle containing the base station 11, and taking into account foreseeable deflections, for instance by a refracting building roof near the mobile terminal 21.

Therefore the initial position can be that intended for the base station 11 or an arbitrary position within the cells. The transmission direction of the beam is selected according to the positions of near salients and their types to cause the beam to pass near the base station 11. Accordingly a sufficient proportion of computations is available.

In particular the method of the invention can be applied to microcells in contact with or included in (macro) cells. Taking into account the substantial height of the antennas of the macrocells, propagation is hampered less by them and the computations can be carried out using a conventional propagation method. Furthermore and by means of the method of the present invention, having also computed the conditions of propagation in a microcell in contact with a macrocell, the propagation conditions in the latter are computed, followed by computational smoothing of the results of the two computations relating to a boundary zone between microcell and macrocell.

In this instance the mesh pitch of the terrain of the map 31 is about 5 m along geographic parallels and meridians. In particular computer 30 can perform the mesh pitch of the terrain by linear interpolation from a smaller-scale altimetry map from IGN having meshes that are substantially large squares 50 m on each side and comprising a vector database which defines, besides the altimetry of the terrain, the positions of the salients and what they are. The computing system meshes out said IGN map into the 5 m pitch by cutting each large square into one hundred little squares 5 m on the sides. The surface bounded by each little square in this manner determines a corresponding sub-set of the data defining the salients positions and what they are.

Next the computing system performs smoothing or low-pass spatial filtering by using an interpolating computation that takes into account the above altimetry data from the large squares adjacent to the one under consideration, by line, column and diagonal. Illustratively the computer 30 modulates the altitude data of the mean ground of the large square under consideration in order to ascertain therein a local, most-probable value for each little square, so as to attain in this manner a matrix sub-set of altimetric data constituting one of the plurality of the zones of the memory module 32.

Other data of global order, for instance relating to specifying the above-ground structures such as woods, lodgements, vacant lots or other, can be computed in this manner. Data that are more specific, for instance specifying the orientation of a building face for the memory module 33, on the other hand, is preferably ascertained from surveys carried out on the terrain, for instance aerial photos. The matrix sub-set of above-ground structure data preferably, and as in this case is complemented by a matrix sub-set of the height data of above-ground structures determined from the differential of the above-ground altitude of the structure and the altitude of the ground relative to sea level. In this manner the data of the memory modules 32, 33 are more accurate and up to date.

What is claimed is:

1. A method of estimating in an anticipatory manner radio coverage of a cell of a cellular, wireless telephone network, by using a radio station for managing the traffic of the cell and a database of a relief map specifying positions of salients in the cell and what the salients are, the method being performed with a computation system, the computation system performing the following steps:

(a) simulate transmission into the cell of a sampling beam that renders the conditions of radioelectric propagation along an initial segment of a path from an initial position and along one direction and in specific conditions of propagation, (b) compare the path segment with the data of the relief map to identify the position and the nature of a salient at any instantaneous incidence site of the path segment by responding to the database, (c) determine, according to the data for the salient specified in the database, new propagation conditions on a downstream path segment beyond the incidence site, (d) iterate as called for by steps (b) and (c) a given number of times for other downstream path segments, (e) determine, according to the propagation conditions along an entire path between a transmitter and a receiver, a cumulative attenuation for any selected site of the path, (f) repeat steps (a)–(e) a plurality of times for a plurality of initial directions to sample the entire cell and thereby ascertain a map of attenuations of the selected sites, (g) during an initial phase:

(i) devise the database as a direct-access matrix of local and independent specification of the positions and kinds of the respective salients of a plurality of predetermined meshes of a corresponding mesh topology of the map, and (ii) store the geographic-orientation data of the salients in the matrix database, (h) during an operational phase (i) compare the position of the instantaneous site with the meshing topology to identify an incidence mesh, (ii) following identification of an incidence, compute post-incidence propagation conditions from the local and independent salient specification data of the incidence mesh, and (iii) compute one direction of the reflected beam of a downstream segment based on the orientation data.

2. The method of claim 1, further including limiting storage to azimuth data and, in the operational phase, calculating the direction of the beam reflected in the downstream path signal by assuming that the reflection salients are vertical.

3. The method of claim 1, further including integrating data specifying the nature of the above-ground structure into the matrix database and, during the operational phase, computing propagation conditions of the downstream path segment according to the nature of the above-ground structure.

4. The method of claim 1, further comprising, in the initial phase, integrating salients edge data into the matrix database, in the operational phase, computing a direction of downstream path segment of the refracted beam on the basis of said edge data.

5. The method of claim 1, wherein, in the initial phase, storing attenuation data of the salients in the matrix database and, in the operational phase, computing a propagation attenuation on the downstream path segment according to the attenuation data.

6. The method of claim 5, wherein the attenuation data relate to reflection at the salients, and further including using the attenuation data to compute the attenuation on the downstream path segment.

7. The method of claim 5, wherein the attenuation data relate to propagation through the salients, and further including using the attenuation data to calculate the attenuation of the beams propagating in the salients.

8. The method of claim 7, wherein the propagation attenuation data through the salients further comprise data indicative of a transition between propagation media specifying penetration attenuations in the salients, and further including using the transition data to determine local penetration attenuation.

9. The method of claim 1, further including computing a plurality of directions of downstream path segments having specific attenuation and forming a solid angle of beam diffusion beyond said incidence by using an algorithm of angular dispersion computation of the beam following its incidence.

10. The method of claim 1, further including counting the consecutive incidences on the beam path and, in the case of a second incidence, assuming that the beam is polarized at the first incidence in order to compute said conditions of trans-propagation.

11. The method of claim 1, further including counting the consecutive incidences of the beam path and comparing the total number of incidences to a high threshold value to stop the operational phase in response to said threshold being reached.

12. The method of claim 1, further including, at each incidence, determining the cumulative propagation attenuation and comparing the cumulative propagation attenuation to a maximum attenuation threshold to stop the operational phase in response to the threshold being reached.

13. The method of claim 1, wherein the attenuation map is stored in 3D.

14. The method of claim 1, wherein the database devising step includes representing the map by a bundle of vertical-extension pixel links and selecting pixel links to form stacked volume elements of volume meshes each comprising particular data.

15. The method of claim 1, further including assigning an initial position to the base station.

16. The method of claim 1, further including assigning an initial arbitrary position within the cell and selecting the beam transmission direction according to the positions and kinds of structures in the vicinity in order that the beam propagates near the base station.

17. The method claims 1, further including calculating propagation conditions within the cell after the propagation conditions within a microcell in contact with the cell have been computed and smoothing the results of two computations relating to a boundary zone between the said cell and microcell.

18. A storage medium for storing a program for enabling a computer system to estimate in an anticipatory manner radio coverage of a cell of a cellular, wireless telephone network by using a radio station for managing the traffic of the cell and a database of a relief map specifying positions of salients in the cell and what the salients are, the program causing the computation system to perform the following steps:

(a) simulate transmission into the cell of a sampling beam that renders the conditions of radioelectric propagation along an initial segment of a path from an initial position and along one direction and in specific conditions of propagation, (b) compare the path segment with the data of the relief map to identify the position and the nature of a salient at any instantaneous incidence site of the path segment by responding to the database, (c) determine, according to the data for the salient specified in the database, new propagation conditions on a downstream path segment beyond the incidence site, (d) iterate as called for by steps (b) and (c) a given number of times for other downstream path segments, (e) determine, according to the propagation conditions along an entire path between a transmitter and a receiver, a cumulative attenuation for any selected site of the path, (f) repeat steps (a)–(e) a plurality of times for a plurality of initial directions to sample the entire cell and thereby ascertain a map of attenuations of the selected sites, (g) during an initial phase:

(i) devise the database as a direct-access matrix of local and independent specification of the positions and kinds of the respective salients of a plurality of predetermined meshes of a corresponding mesh topology of the map, and (ii) store the geographic-orientation data of the salients in the matrix database, (h) during an operational phase (i) compare the position of the instantaneous site with the meshing topology to identify an incidence mesh, (ii) following identification of an incidence, compute post-incidence propagation conditions from the local and independent salient specification data of the incidence mesh, and (iii) compute one direction of the reflected beam of a downstream segment based on the orientation data.

19. A computer system for estimating in an anticipatory manner radio coverage of a cell of a cellular, wireless telephone network, by using a radio station for managing the traffic of the cell and a database of a relief map specifying positions of salients in the cell and what the salients are, the computer system comprising the data base and a computational section, the data base and computational section being arranged for performing the following steps:

(a) simulate transmission into the cell of a sampling beam that renders the conditions of radioelectric propagation along an initial segment of a path from an initial position and along one direction and in specific conditions of propagation, (b) compare the path segment with the data of the relief map to identify the position and the nature of a salient at any instantaneous incidence site of the path segment by responding to the database, (c) determine, according to the data for the salient specified in the database, new propagation conditions on a downstream path segment beyond the incidence site, (d) iterate as called for by steps (b) and (c) a given number of times for other downstream path segments, (e) determine, according to the propagation conditions along an entire path between a transmitter and a receiver, a cumulative attenuation for any selected site of the path, (f) repeat steps (a)–(e) a plurality of times for a plurality of initial directions to sample the entire cell and thereby ascertain a map of attenuations of the selected sites, (g) during an initial phase:

(i) devise the database as a direct-access matrix of local and independent specification of the positions and kinds of the respective salients of a plurality of predetermined meshes of a corresponding mesh topology of the map, and (ii) store the geographic-orientation data of the salients in the matrix database, (h) during an operational phase (i) compare the position of the instantaneous site with the meshing topology to identify an incidence mesh, (ii) following identification of an incidence, compute post-incidence propagation conditions from the local and independent salient specification data of the incidence mesh, and (iii) compute one direction of the reflected beam of a downstream segment based on the orientation data.

* * * * *